(12) United States Patent
Mangan

(10) Patent No.: US 7,536,689 B2
(45) Date of Patent: May 19, 2009

(54) METHOD AND SYSTEM FOR OPTIMIZING THREAD SCHEDULING USING QUALITY OBJECTIVES

(75) Inventor: Timothy Richard Mangan, Canton, MA (US)

(73) Assignee: Tricerat, Inc., Columbia, MD (US)

( * ) Notice: Subject to any disclaimer, the term of this patent is extended or adjusted under 35 U.S.C. 154(b) by 832 days.

(21) Appl. No.: 10/751,873

(22) Filed: Jan. 6, 2004

(65) Prior Publication Data

US 2005/0076337 A1 Apr. 7, 2005

Related U.S. Application Data

(60) Provisional application No. 60/439,374, filed on Jan. 10, 2003.

(51) Int. Cl.
*G06F 9/46* (2006.01)

(52) U.S. Cl. .................................. 718/100; 718/103
(58) Field of Classification Search ................. 718/102, 718/103, 100
See application file for complete search history.

(56) References Cited

U.S. PATENT DOCUMENTS

| 5,210,872 | A  | * | 5/1993  | Ferguson et al. | 718/102 |
| 6,785,889 | B1 | * | 8/2004  | Williams        | 718/104 |
| 6,957,433 | B2 | * | 10/2005 | Umberger et al. | 718/103 |

* cited by examiner

*Primary Examiner*—Meng-Ai An
*Assistant Examiner*—Camquy Truong
(74) *Attorney, Agent, or Firm*—Lawrence E. Laubscher, Jr.

(57) ABSTRACT

The invention provides for a method of optimizing the scheduling of program threads within an operating system based on quality objectives, and a system implementing said method.

6 Claims, 5 Drawing Sheets

METHOD AND SYSTEM FOR OPTIMIZING THREAD SCHEDULING USING QUALITY OBJECTIVES

CROSS-REFERENCE TO RELATED APPLICATIONS

This application is the successor of Provisional Patent Application No. 60/439,374 filed on Jan. 10, 2003.

TECHNICAL FIELD

The invention relates generally to the field of processor scheduling, and, more specifically to the field of scheduling programs based upon desired "quality of service" objectives.

BACKGROUND OF THE INVENTION

A computer system consists of one or more physical (or logical) central processing units, and software. The software consists of an operating system and applications. The operating system controls the hardware and enables various applications to execute.

A multitasking operating system allows multiple applications to execute seemingly simultaneously, by rapidly switching between multiple tasks.

The applications may consist of one or more execution units, called processes. Each of these processes may also consist of one or more thread units. A thread is the smallest execution context that may be scheduled for execution. A task is the generic term for a process or thread.

Typically, only one task may be actually executing instructions in a processor at a given time. In a multi-processor system, one task may be executing in each of the processor units at a time.

The multitasking operating systems include a schedule component responsible for the determination of which task will execute at any given time. A scheduling algorithm is used to make this determination.

The prior art task scheduling algorithms of conventional operating systems often consist of some combination of a task state, time allocation, priority, and length of time waiting for execution:

While systems may categorize tasks by a variety of states, for the purpose of scheduling, the states may be summarized as "currently executing:, "ready to execute", or "not ready to execute". A task in the currently executing state is one that is presently executing instructions in a processor. A task that is in the ready to execute state is one that is not presently executing instructions in a processor, however is able to do so at the next opportunity to do so. A task in the not ready to execute state is one that is not presently executing instructions in a processor, and should not be scheduled to do so because it has no work of value to perform at this time.

A time allocation is the maximum time that a task is allowed to continuously execute in a processor without allowing another task an opportunity to execute.

An overall priority for the task may be determined by a number of factors, including combinations of application, process, and/or thread based priority, and adjustments due to current conditions of the task.

In conventional operating systems, an executing task may be suspended (temporarily set aside) for one of multiple causes, usually including:

The task itself requests execution suspension when it desires to allow other tasks to execute because it has finished with a desired action or is waiting for a resource (for example, access to a disk), communication, or input (user action).

The task scheduling may pre-empt and suspend a task due to a change of state of a higher priority suspended task.

The task scheduling may pre-empt and suspend a task due to a change of priority of another suspended task.

The task scheduling might pre-empt a task after a period of time.

Suspension of a task involves the saving of its execution state and data structures, which may later be swapped back in to continue execution as if it were never suspended.

When a thread enters a "ready to execute state", it is added to the end of a ready queue (possibly based on its priority). In a pre-emptive scheduler, this may cause the currently executing thread to be suspended.

In a conventional, multi-purpose operating system, when one or more tasks consume too many common resources (such as CPU cycles), other tasks may become "starved", meaning they do not receive sufficient, or timely, execution. The effect of this is that the starved tasks may cause unacceptable feedback latency to users or in the extreme software may fail time-outs or crash. On systems supporting multiple users, such effects can limit the number of users that may perform useful work.

In the field of communications packet processing, a parallel set of issues exists. A device may process packets commutation streams from many sources. Often these streams compete with each other for use of a limited shared resource, such as bandwidth on a wide-area network link. If one stream uses too much of the shared resource, other streams may become starved, causing packet retransmissions, time-outs, or in the extreme application failures.

To overcome these issues in packet processing, Quality-of-Service (QoS) algorithms are sometimes used to schedule packets from multiple streams. A QoS based scheduling algorithm uses as input a set of quality parameters outlining ranges of acceptable (or desired) resource usage ranges for competing uses. By applying QoS metrics and algorithms to packet processing, these problems have been overcome in the packet-processing field.

SUMMARY OF THE INVENTION

The present invention consists of a computer, with a scheduling sub-system that overcomes the problems caused by applications consuming too many resources. The invention uses an input parameter table to describe a set of quality metrics to be used by the scheduling system to adjust the scheduling algorithm based upon measured resource usage. The present system allows these metrics to be described on a either a per-system, per-application, per process, or a per-thread basis.

The input parameter table used to define the set of quality metrics includes the following:
  Base scheduling parameters (e.g. priority and scheduling interval).
  Maximum resource use constraint limit
  Minimum resource use constraint limit
  Maximum badly behaved burst length
  Minimum very-well behaved burst length The scheduling sub-system maintains a memory table information on each task including:
  Quality metrics (including initial schedule parameters)
  Current task behavior state
  Current (adjusted) scheduling parameters The scheduling sub-system monitors resource usage of all tasks to be monitored on a periodic interval. For each interval:

A determination is made whether the task has:
   Used more than the maximum constraint limit,
   Used less than the maximum constraint but more than the minimum constraint limit, or
   Used less than the minimum constraint limit.

This determination is used, along with history of recent intervals for this task and the burst length from the parameter table, to designate a behavior state for the task:
   Badly behaved
   Well behaved
   Very-well behaved A task is badly behaved if it exceeds the maximum constraint more than allowed by the maximum burst length. The scheduling of a task that is badly behaved beyond the maximum burst length parameter is adjusted to allow competing tasks to achieve their quality objectives.

A task that is very-well behaved beyond the minimum burst length parameter is credited for this and adjustments to its scheduling may be removed.

The adjustments to the scheduling of a task that is badly behaved beyond the maximum burst length parameter include one or more of the following:
   A reduction in priority.
   A reduction in maximum execution time without pre-emption.

The present invention has a preferred embodiment and an alternative embodiment described. Additional embodiments are variations of the described embodiments, obvious to someone skilled in this art.

The preferred embodiment consists of a single scheduling sub-system as part of a multitasking operating system kernel. This sub-system consists of two components. The first component is responsible for scheduling tasks based on current scheduling parameters. The second component is a control component, responsible for determining the current parameters.

The alternative embodiment uses a combination of a standard prior-art commercial task scheduling sub-system as part of a multitasking operating system kernel with a secondary scheduling sub-system that controls the prior-art sub-system. The secondary control sub-system may or may not be part of the OS kernel.

DETAILED DESCRIPTION OF THE INVENTION

Figure 1:
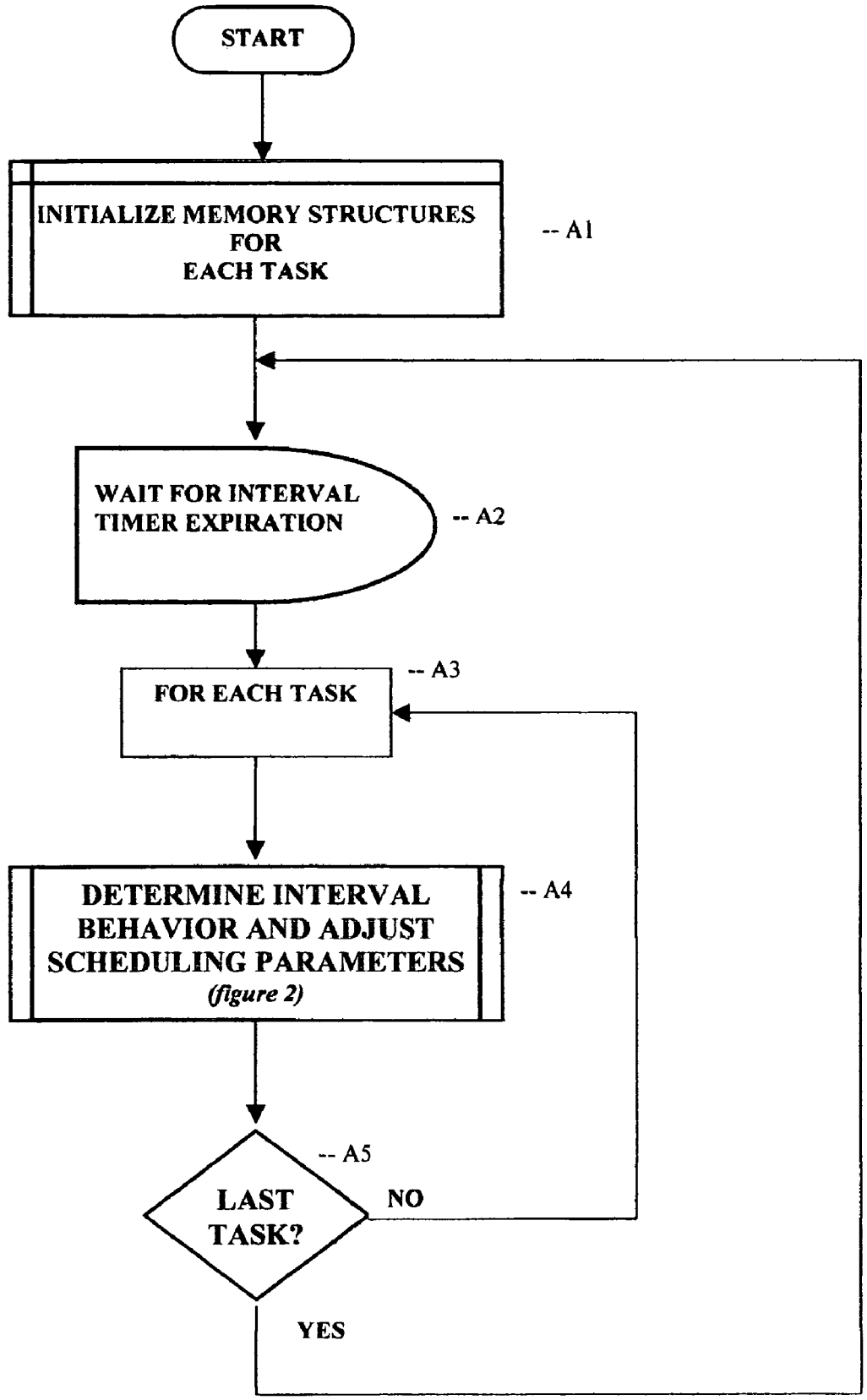
FIG. 1 is a flow diagram for the logic of the control portion of the scheduling sub-system. This logic represents an alternative embodiment. Each of the subsequent figures represent sub-functions of this method.

The present invention provides for a scheduling algorithm that periodically adjusts scheduling parameters of tasks based on comparison of resource usage against desired resource limitations.

In order to convey the details of the scheduler important to this invention, we present the alternative embodiment that uses well-known existing prior-art embodiments for details not specific to this invention. Those skilled in the art will recognize that some aspects of this embodiment may differ from other embodiments of the invention.

This specific embodiment uses a general-purpose computer system consisting of (at least) a processing unit (CPU), memory, and a general-purpose operating system supporting multi-tasking and applications. In this embodiment, a scheduler sub-system exists that is made from separate components to better isolate the present invention. Those skilled in the art will recognize that an embodiment need not separate these aspects into two different components.

The first of these two scheduler components is the general purpose scheduler subsystem, such as may be found in many commercial operating systems.

The general-purpose operating system scheduling sub-system uses some memory to store tables of information for tasks that are running in the system. An example of such a table is shown in TABLE 1.

TABLE 1

| IDENTIFIER | PRIORITY | MAX INTERVAL | TASK STATE |
| --- | --- | --- | --- |
| 1 | NORMAL | 20 ms | NOT-READY |
| 2 | NORMAL | 20 ms | EXECUTING |
| 3 | NORMAL | 20 ms | READY |
| 4 | HIGH | 10 ms | NOT-READY |
| 5 | LOW | 20 ms | READY |

A task may be in a state of not-ready because it needs a resource (such as a disk) to become available or an event to occur (such as a message or timer). A task that is ready to execute the next time the general-purpose schedule subsystem permits it to execute is in the ready state.

The general-purpose scheduling subsystem also maintains a list of tasks that are in the ready state in the form of a set of ready-queues. Each ready-queues contain a list of tasks of a given priority that are in the ready state. When a task enters the ready state, it is added to the end of the ready-queue for its priority.

When the general-purpose schedule subsystem needs a task to execute, it searches the ready-queues starting with the highest priority queue. If there are any tasks in the queue, it selects the task at the top of that queue. If there are no tasks in this queue it searches the next highest priority queue.

When the general-purpose schedule subsystem selects a task, it removes the task from the ready queue, changes the tasks state to executing, and activates the task. This task may be allowed to execute until one or more of the following occur:
   The task enters the not-ready state
   A higher priority task enters the ready-queue
   The max interval expires Some general-purpose schedule subsystems may also temporarily adjust scheduling parameters to boost the priority of certain tasks under certain conditions. These adjustments are not based on quality based resource usage, but based upon external action such as a user changing the foreground application, a device (such as a keyboard or disk) that a task is waiting on becoming available.

The second of the two schedule components, the control component, in this specific embodiment augments the general-purpose schedule subsystem by periodically examining the resource utilization of tasks in the system and adjusts parameters used by the general-purpose schedule subsystem.

Logic Flow Description of the Control Component

A logic flow of the control component is shown in FIGS. 1 through 5. Those skilled in the art will recognize that other logic flows containing the components are also possible. FIG. 1 represents a high level view of a logic flow of the control component. The additional figures provide detail flows of summarized in higher-level modules.

The control component maintains a memory table of additional information for tasks in the system. This table is initialized in FIG. 1 module A1. An example of the fields of such a table is shown in TABLE 2:

TABLE 2

IDENTIFIER
BASE PRIORITY
BASE INTERVAL
MAXIMUM RESROUCE LIMIT
MINIMUM RESOURCE LIMIT
BADLY BEHAVED BURST LENGTH
VERY-WELL BEHAVED BURST LENGTH
BADLY BEHAVED COUNT
VERY-WELL BEHAVED COUNT
CURRENT PRIORITY
CURRENT INTERVAL

The control component uses a timer (FIG. 1 module A2) to periodically execute the schedule adjustment algorithm.

When the timer expires, the algorithm loops for each task (FIG. 1 modules A3 through A5) until all tasks have been checked. When all tasks have been checked (FIG. 1 module A5) the logic waits on the timer again. The purpose of FIG. 1 module A4 is generally to determine the resource usage of the task and make any adjustments to the scheduling parameters. FIG. 1 module A4 is further detailed in FIG. 2 and described below.

Figure 2:
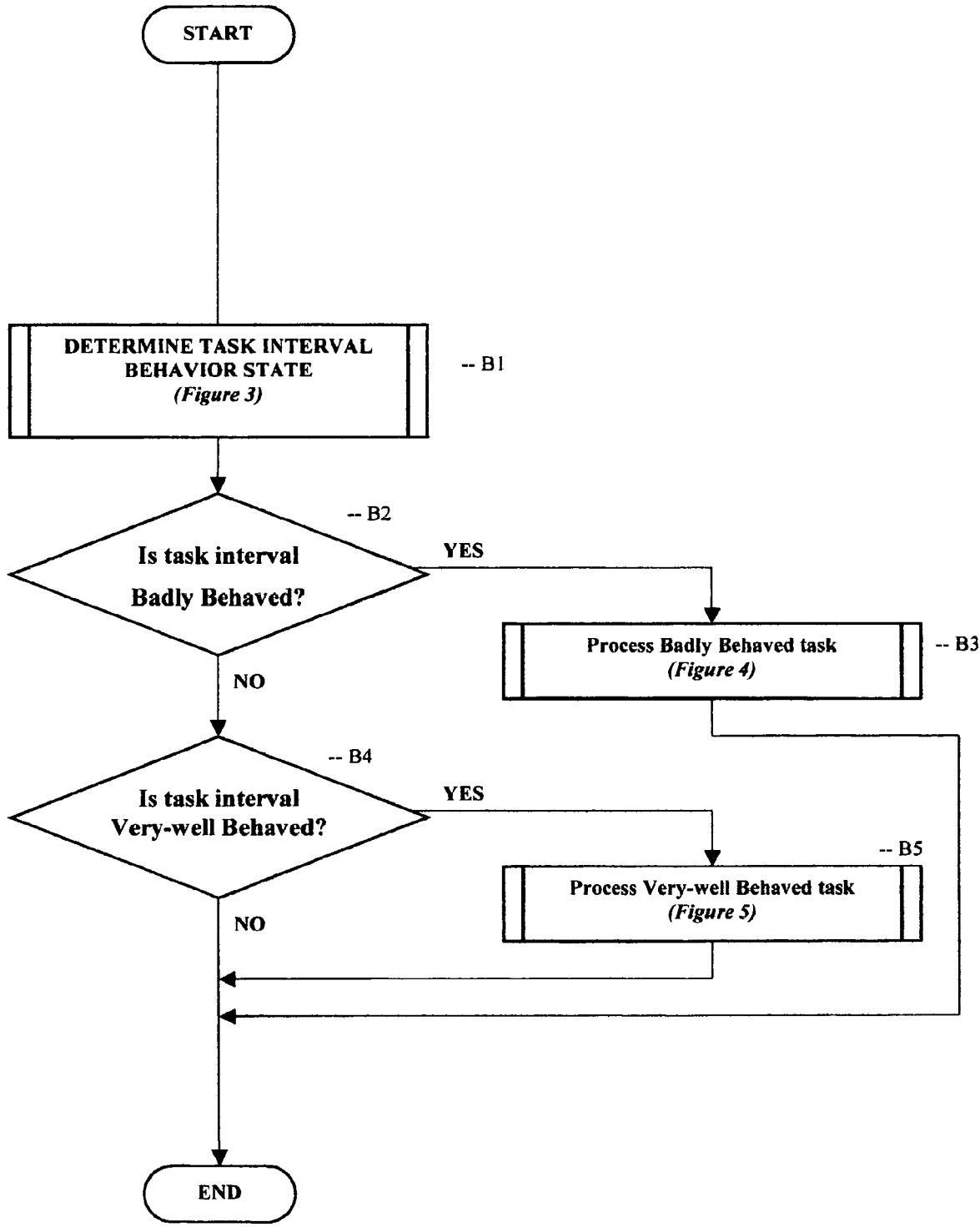
FIG. 2 is a flow diagram of the overall method of execution for each task at each interval.

An interval behavior state of the task is determined in FIG. 2 module B1. This is further detailed in FIG. 3 (and described below).

Logic Flow Description of Control Component for Each Task

FIG. 2 illustrates a logic flow used for each task.

Figure 4:
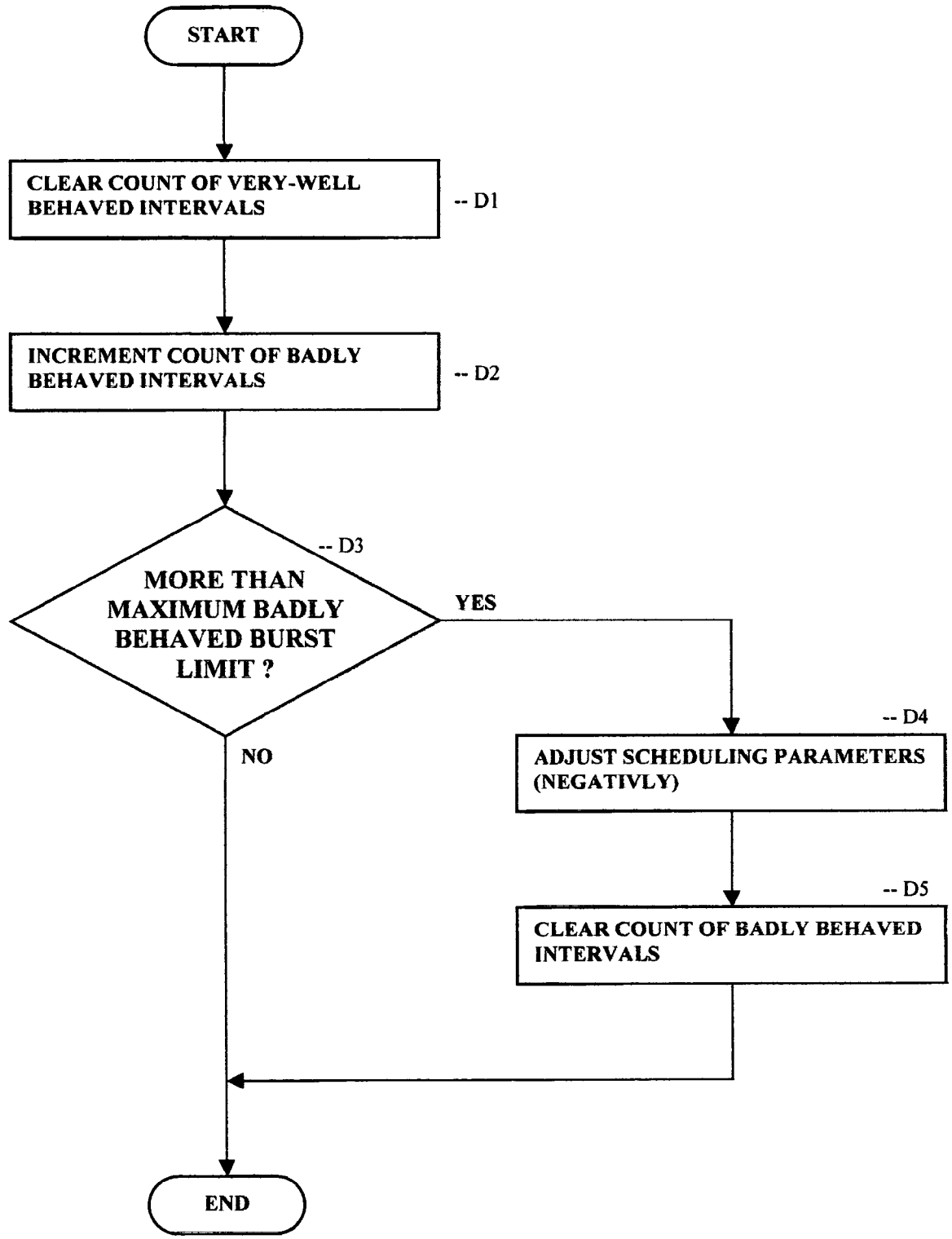
FIG. 4 is a flow diagram of processing logic of the interval behavior state of a task when the task is badly behaved.

In FIG. 2 module B2, if the interval behavior state is that the task was badly behaved in the interval, the control component processes the badly behaved task (FIG. 2 module B3, further detailed in FIG. 4). Otherwise control flows to FIG. 2 module B4.

Figure 5:
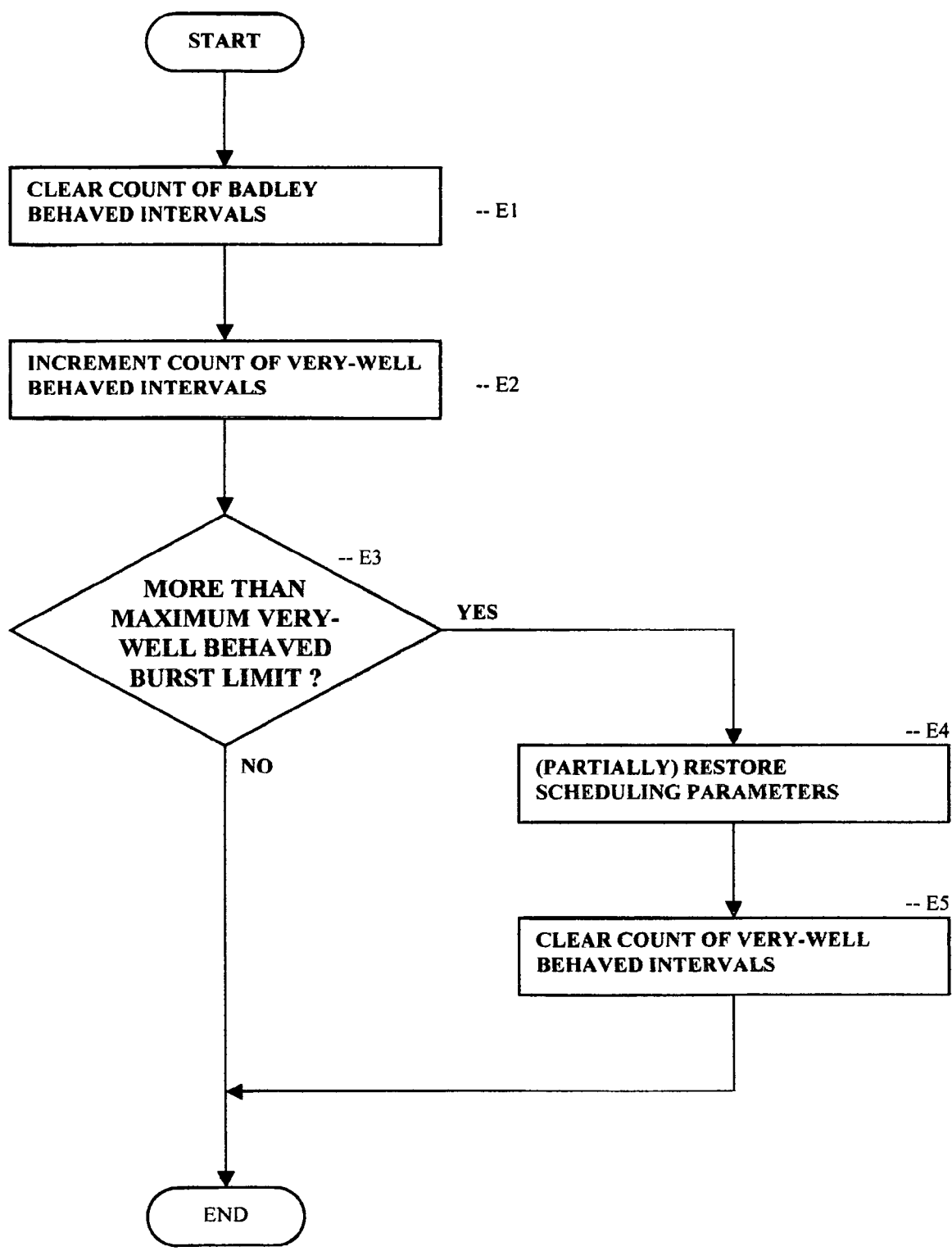
FIG. 5 is a flow diagram of processing logic of the interval behavior state of a task when the task is very-well behaved.

In FIG. 2 module B4, if the interval behavior state is that the task was very-well behaved in the interval, the control component processes the very-well behaved task (FIG. 2 module B5, further detailed in FIG. 5). Otherwise the interval behavior state of the task was well behaved (and no processing is required for the task).

Logic Flow for Determination of Interval Behavior State

Figure 3:
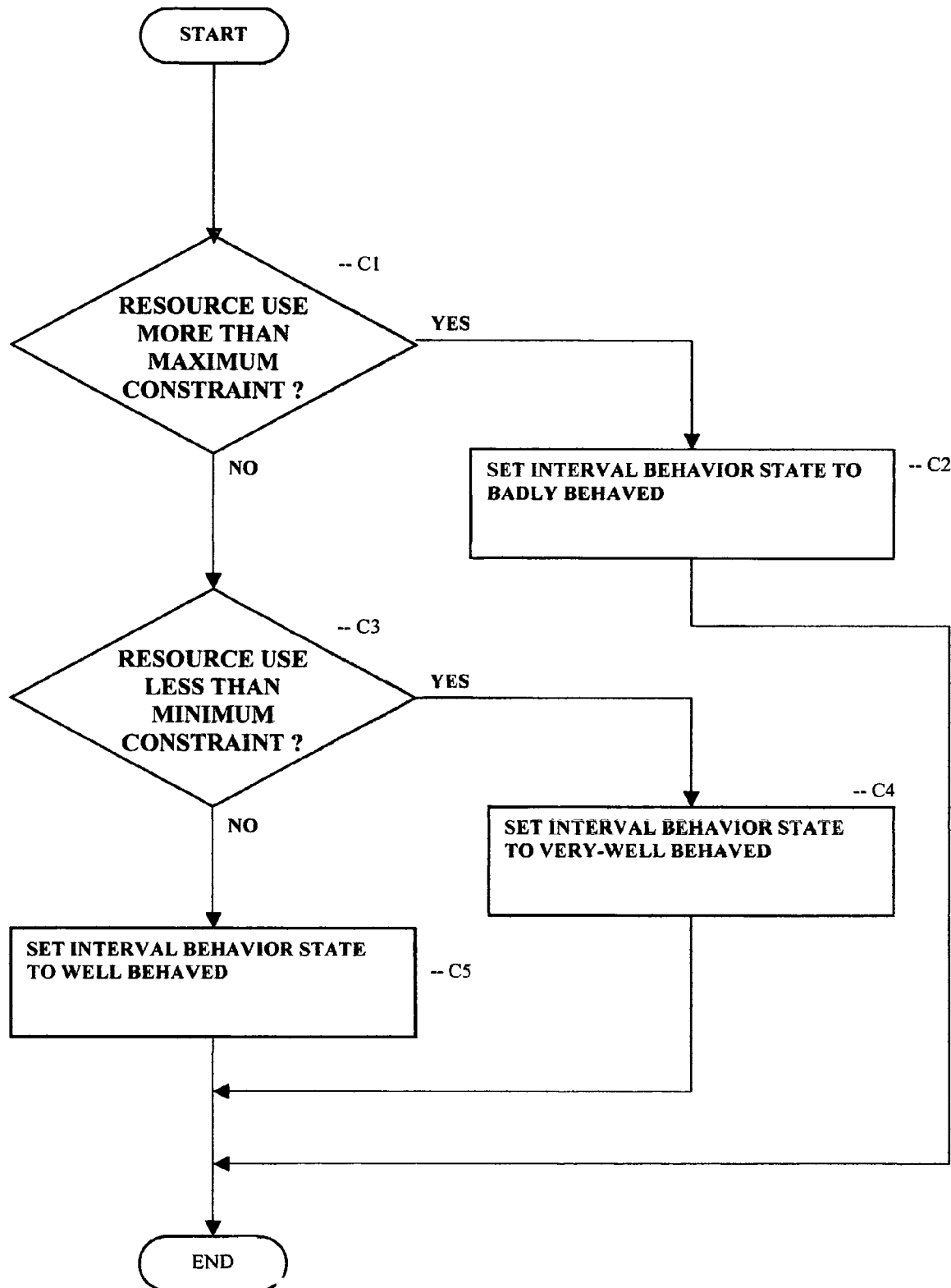
FIG. 3 is a flow diagram of logic used to determine the interval behavior state of a task.

FIG. 3 illustrates the logic flow for determining the interval behavior state. The resource usage of the task for the most recent interval is determined (via exact means or estimation). For example, most commercial operating systems provide for absolute per-task estimations of CPU usage. In this case the control component can maintain the previous value and take a difference between the previous value and the current value.

In FIG. 3 module C1 a test is made to determine if the resource usage of the task for the most recent interval is greater than the maximum constraint. If the test passes, control is passed to module C2 where the interval behavior state for the task is set to badly behaved. Otherwise control is passed to module C3.

In FIG. 3 module C3, a test is made to determine if the resource usage of the task for the most recent interval is less than the minimum constraint. If the test passes, control is passed to module C4 where the interval behavior state for the task is set to very-well behaved. Otherwise control is passed to module C5 where the interval behavior state for the task is set to well behaved.

Flow Control for Processing Badly Behaved Task

FIG. 4 illustrates the flow control for processing of a task that was badly behaved in the interval.

The count of very-well behaved intervals is cleared (FIG. 4 module D1). The count of badly behaved intervals is incremented by one (FIG. 4 module D2) and compared to the badly behaved burst limit (FIG. 4 module D3). If the count exceeds the limit, control is passed to modules D4 and D5.

In module D4 adjustments are made to the current scheduling parameters for the task (for example, reducing priority and/or maximum scheduling interval).

In module D5 the badly behaved count is cleared.

Flow Control for Processing Very-Well Behaved Task

FIG. 5 illustrates the flow control for processing of a task that was very-well behaved in the interval.

The count of badly behaved intervals is cleared (FIG. 5 module E1). The count of very-well behaved intervals is incremented by one (FIG. 5 module E2) and compared to the very well behaved burst limit (FIG. 5 module E3). If the count exceeds the limit, control is passed to modules E4 and E5.

In module E4 previous adjustments made to the current scheduling parameters for the task (for example, reduction of priority and/or maximum scheduling interval) are partially or fully restored.

In module E5 the very-well behaved count is cleared.

Note that in FIG. 2 for the case of the interval behavior state being well behaved in the interval, no action is taken by the component. A well behaved interval does not clear the count of either badly-behaved intervals or very-well behaved intervals.

Logic Flow for Overhead Reduction

The control component of the schedule sub-system requires processor cycles to execute, reducing the overall processor cycles available for application tasks. This is usually referred to as overhead.

Most of this overhead is caused by the logic flow in FIG. 1 modules A3 through A5. This overhead may optionally be reduced through the detection of tasks which, based upon prior measured behavior, are less likely than others to become badly behaved Said tasks may be detected, and the frequency of processing FIG. 1 module A4 may be reduced for these tasks.

Those skilled in the art will discern several embodiments to accomplish this reduction.

CONCLUSION

When a quality metric based task scheduler is used, the overall operation of a resource constrained multi-tasking system is improved. By adjusting scheduling parameters on the fly, tasks may be prevented from consuming too many resources for too long a period, allowing fair access to the constrained resource to all.

The ramifications of such a system are perhaps best illustrated with an example. Tests were made on a commercially available general-purpose multitasking operating system. A test was designed that measured ready-task latency (delay time from when an average priority task becomes ready to when it actually begins execution). When one or more tasks are added to this system causing contention for the shared CPU resource, ready-task latency increases dramatically. A component is then introduced to the system to control the scheduling parameters. This test shows it is possible to reduce or even eliminate both the size and/or duration of latency increases. The effects of this on the system provides benefits including:

Reduction in time-outs leading to improved system stability under load.

Improved feedback to users (e.g. response to keyboard input mouse click, reflected on display.

The invention claimed is:

1. A computer system comprising:
   a. one or more processing units,
   b. a memory which is capable of storing information,
   c. a multitasking operating system for executing multiple tasks, and
   d. a scheduling sub-system that causes tasks to be executed in a central processing unit based on criteria including recent task resource usage and pre-established quality metrics including priority, maximum and minimum resource use constraint limits, and maximum and minimum task duration, said task resource being measured and adjusted to the scheduling sub-system and allowable task resource usage bursts being assigned on a per application, per process, or per thread basis,
   whereby said sub-system selects said tasks for execution based, at least in part, on comparing resources used by at least one previous task within a predetermined interval to desired resource limitations.

2. The computer system according to claim 1 wherein said quality metrics are assigned on a per application, per process, or per thread basis.

3. The computer system according to claim 1 wherein overhead of the scheduling sub-system is reduced by analyzing past activity to predict threads which are unlikely to exceed quality parameters in the future.

4. A computer system comprising:
   a. one or more processing units,
   b. a memory which is capable of storing information,
   c. a multitasking operating system for executing multiple tasks,
   d. a scheduling sub-system comprising one or more sub-systems responsible for scheduling that causes tasks to be executed in a central processing unit based on criteria including recent task resource usage and re-established quality metrics including priority, maximum and minimum resource use constraint limits, and maximum and minimum task duration, and
   e. a service or daemon background application is added to an existing general purpose scheduling sub-system,
   whereby said sub-system selects said tasks for execution based, at least in part, on comparing resources used by at least one previous task within a predetermined interval to desired resource limitations.

5. A method of scheduling tasks for execution in a computer processor, comprising the steps of:
   a. storing information in a memory,
   b. executing multiple tasks in a multitasking operating system, and
   c. executing tasks in a central processing unit based on criteria from a schedule sub-system including recent task resource usage and pre-established quality metrics including priority, maximum and minimum resource use constraint limits, and maximum and minimum task duration, said task resource being measured and adjusted to the scheduling sub-system and allowable task resource usage bursts being assigned on a per application, per process, or per thread basis,
   whereby tasks are selected for execution based, at least in part, on comparing resources used by at least one previous task within a predetermined interval to desired resource limitations.

6. A method of scheduling tasks for execution in a computer processor, comprising the steps of:
   a. storing information in a memory,
   b. executing multiple tasks in a multitasking operating system, and
   c. executing tasks in a central processing unit based on criteria from a schedule sub-system comprising one or more sub-systems responsible for scheduling and including recent task resource usage and pre-established quality metrics including priority, maximum and minimum resource use constraint limits, and maximum and minimum task duration, said task resource being measured and adjusted to the scheduling system, and
   e. a service or daemon background application is added to an existing general purpose scheduling sub-system,
   whereby tasks are selected for execution based, at least in part, on comparing resources used by at least one previous task within a predetermined interval to desired resource limitations.

* * * * *